US009415499B2

(12) United States Patent
Brotto et al.

(10) Patent No.: US 9,415,499 B2
(45) Date of Patent: Aug. 16, 2016

(54) ADAPTER FOR CORDLESS POWER TOOLS (75) Inventors: Daniele C. Brotto, Baltimore, MD (US); Bhanuprasad V. Gorti, Perry Hall, MD (US); Daniel J. White, Baltimore, MD (US); Shelby K. Starks, Baltimore, MD (US); Geoffrey S. Howard, Columbia, MD (US); Allen K. Brelsford, Baldwin, MD (US); Jeffrey Francis, Nottingham, MD (US); Jeffrey Norris, Fallston, MD (US); Andrew E. Seman, Jr., White Marsh, MD (US); David A. Carrier, Aberdeen, MD (US); Danh T. Trinh, Parkville, MD (US)

(73) Assignee: Black & Decker Inc., New Britain, CT (US)

( * ) Notice: Subject to any disclaimer, the term of this patent is extended or adjusted under 35 U.S.C. 154(b) by 864 days.

(21) Appl. No.: 13/560,089

(22) Filed: Jul. 27, 2012

(65) Prior Publication Data

US 2012/0302101 A1    Nov. 29, 2012

Related U.S. Application Data (62) Division of application No. 12/155,894, filed on Jun. 11, 2008.

(60) Provisional application No. 60/944,196, filed on Jun. 15, 2007.

(51) Int. Cl.
*H02J 7/00* (2006.01)
*B25F 5/02* (2006.01)
*H01M 2/10* (2006.01)
*H01M 10/48* (2006.01)
*H01M 10/46* (2006.01)

(52) U.S. Cl.
CPC .............. *B25F 5/029* (2013.01); *H01M 2/1022* (2013.01); *H01M 10/48* (2013.01); *H01M 10/46* (2013.01); *H02J 7/0042* (2013.01); *H02J 7/0044* (2013.01); *H02J 7/0045* (2013.01)

(58) Field of Classification Search
CPC ......... H02J 7/0042; H02J 7/0044; H02J 7/02; H02J 7/00; H02J 7/0045; H02M 2/10; B25F 5/02; B25F 3/00; B25F 5/029; H01M 2/1022; H01M 10/46; H01M 10/48
USPC ................. 320/110, 111, 103, 107, 112–115; 173/46; 307/131, 151
See application file for complete search history.

(56) References Cited

U.S. PATENT DOCUMENTS

| 2001/0015579 | A1* | 8/2001 | Nakagawa et al. | ........... 307/150 |
| 2001/0017531 | A1* | 8/2001 | Sakakibara et al. | ......... 320/106 |
| 2002/0125857 | A1* | 9/2002 | Mastaler et al. | ............. 320/112 |
| 2005/0077873 | A1* | 4/2005 | Watson et al. | ................ 320/114 |
| 2007/0210744 | A1* | 9/2007 | Watson et al. | ................ 320/112 |
| 2007/0224492 | A1* | 9/2007 | Scott et al. | ....................... 429/99 |
| 2008/0012526 | A1* | 1/2008 | Sadow | .......................... 320/111 |

* cited by examiner

*Primary Examiner* — Nathaniel Pelton
(74) *Attorney, Agent, or Firm* — Michael Aronoff (57) ABSTRACT An electrical combination including a power tool, charger and an adapter separate from and connectable between the battery and the tool housing or battery charger to support the battery on the tool housing or the battery charger, the adapter having adapter leads for electrically coupling the battery to the power tool or the battery charger, the adapter having a mechanical lockout for allowing an electrical coupling between the adapter and the power tool while preventing an electrical coupling between the adapter and the battery charger.

9 Claims, 9 Drawing Sheets

ADAPTER FOR CORDLESS POWER TOOLS

DOMESTIC PRIORITY INFORMATION

This application is a divisional of U.S. patent application Ser. No. 12/155,894, filed Jun. 11, 2008, which claims priority under 35 U.S.C. §119 on U.S. Provisional Application 60/944,196, filed Jun. 15, 2007; the entire contents of which are hereby incorporated by reference.

INTRODUCTION

The present invention generally relates to cordless power tool systems and more particularly to a system of cordless power tools that employs one or more tools and a battery charger that are configured for a first battery platform, a battery from a second battery platform and an adapter to adapt the battery to the tools and/or to the battery charger.

Various adapters for converting one power source to another power source are known as is shown in U.S. Pat. Nos. 6,876,173 and 7,183,745, for example. While such adapters are suited for their intended purpose, such adapters and systems of cordless power tools are susceptible to improvement.

BRIEF DESCRIPTION OF THE DRAWINGS

The drawings described herein are for illustration purposes only and are not intended to limit the scope of the present disclosure in any way.

DETAILED DESCRIPTION OF THE VARIOUS EMBODIMENTS

Figure 1:
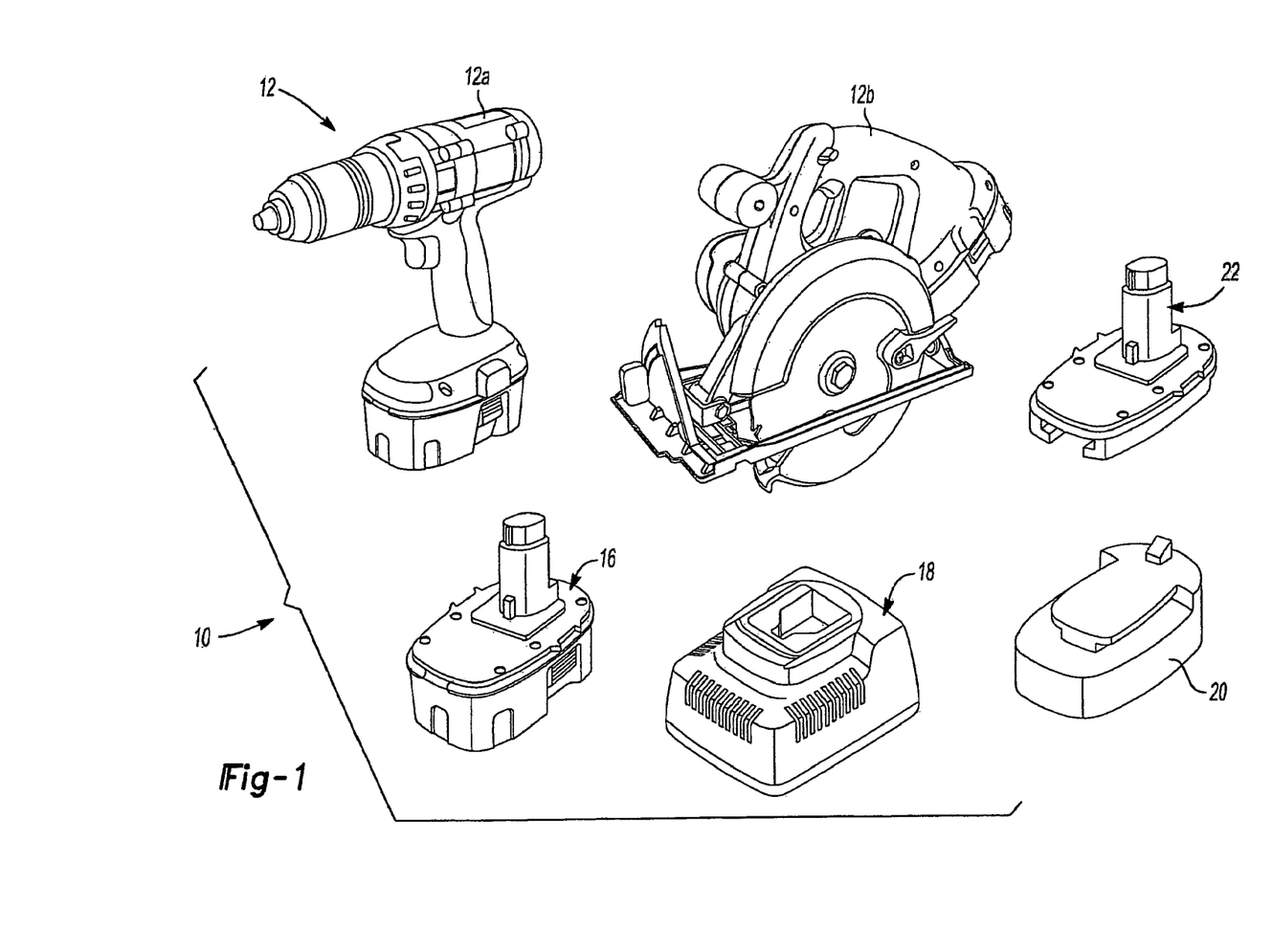
FIG. 1 is a perspective view of an exemplary system of tools constructed in accordance with the teachings of the present disclosure.

The present disclosure can relate to a system of power tools of the type that is generally indicated by reference numeral 10 in FIG. 1. The system of power tools 10 can include, for example, one or more power tools 12, a first battery pack 16, a battery pack charger 18 that is configured to charge the battery pack 16, a second battery pack 20 having a configuration that is different than the first battery pack 16 and an adapter 22 that is configured to couple the second battery pack 20 to the power tools 12. Each of the power tools 12 can be any type of power tool, including without limitation drills, drill/drivers, hammer drill/drivers, rotary hammers, screwdrivers, impact drivers, circular saws, jig saws, reciprocating saws, band saws, cut-off tools, cut-out tools, shears, sanders, vacuums, lights, routers, adhesive dispensers, concrete vibrators, lasers, staplers and nailers. In the particular example provided, the system of power tools 10 includes a first power tool 12a and a second power tool 12b. For example, the first power tool 12a can be a drill/driver similar to that which is described in U.S. Pat. No. 6,431,289, while the second power tool 12b can be a circular saw similar to that which is described in U.S. Pat. No. 6,996,909. The first battery pack 16 can be selectively removably coupled directly to the first and second power tools 12a and 12b to provide electrical power thereto. The first battery pack 16 can have a first configuration that is adapted to directly couple to the first and second power tools 12a and 12b. In the particular example provided, the first battery pack 16 has a tower-type housing, blade terminals, a Ni-Cad battery chemistry and an 18 volt nominal voltage, such as a DC9096 battery pack that is commercially available from Black & Decker, Inc. of Towson, Md. The first battery pack 16 can also be selectively electrically coupled to the battery pack charger 18 to charge the first battery pack 16. The battery pack charger 18 can be configured in a desired manner to directly charge the first battery pack 16. In the particular example provided, the battery pack charger 18 is a DW9116 charger that is commercially available from Black & Decker, Inc. of Towson, Md. The second battery pack 20 can be configured differently than the first battery pack 16. For example, the second battery pack 20 could employ a housing, a set of electric terminals, a battery chemistry, and/or a nominal voltage that is/are different from those of the first battery pack 16. In the particular example provided, the second battery pack 20 has a slide-type housing, blade terminals, a nano-phosphate lithium ion battery chemistry and a 36 volt nominal voltage, such as a DC9360 battery pack that is commercially available from Black & Decker, Inc. of Towson, Md. The adapter 22 is configured to adapt the second battery pack 20 to the tools 12 to provide electrical power thereto. It will be appreciated that it may not be desirable in some instances to charge the second battery pack 20 on the battery charger 18 and/or to directly operate the tool 12 with the second battery pack 20.

Figure 2:
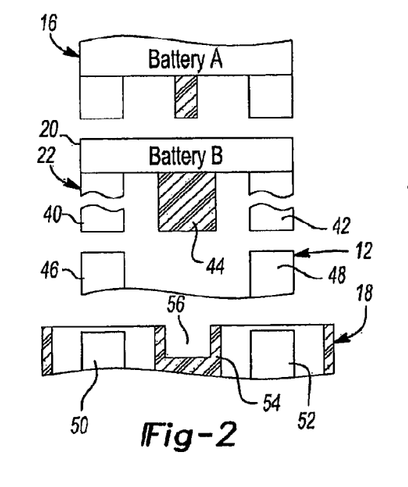
FIG. 2 is a schematic illustration of the terminals of several of the components of FIG. 1 wherein a first type of mechanical lockout is employed to prevent the coupling of a battery pack with a battery charger.

With additional reference to FIG. 2, the tool 12, the second battery pack 20, the battery charger 18 and the adapter 22 could employ a mechanical lock-out system that permits the second battery pack 20 to be coupled to the tool 12 (via the adapter 22) but not to the battery charger 18. The mechanical lock-out system could include an insulating barrier that could be disposed proximate (e.g., between) the electric terminals of the various components. In the example provided, the adapter 22 includes a first adapter terminal 40, a second adapter terminal 42, and a barrier member 44 that is disposed between the first and second adapter terminals 40 and 42. The barrier member 44 can be formed of an insulating plastic material and can have a first width. The tool 12 in the example provided includes a first tool terminal 46, a second tool terminal 48 that is spaced apart from the first tool terminal 46 by a distance that permits the barrier member 44 of the adapter 22 to be received therebetween. As the first and second adapter terminals 40 and 42 are configured to electrically engage the first and second tool terminals 46 and 48 and to be electrically coupled to corresponding terminals (not shown) of the second battery pack 20, it will be appreciated that the second battery pack 20 can be coupled to the tool 12 via the adapter 22.

In contrast, the battery charger 18 in the example provided includes a first charger terminal 50, a second charger terminal 52 and a shroud 54 that is disposed at least partially about the first and second charger terminals 50 and 52. The shroud 54 can define a recess 56 between the first and second charger terminals 50 and 52 having a second width that is smaller than the first width. Accordingly, the barrier member 44 of the adapter 22 cannot be received into the recess 56, which prevents electrical connection between the first and second adapter terminals 40 and 42 and the first and second charger terminals 50 and 52 so that the second battery pack 20 cannot be electrically coupled to the battery charger 18 via the adapter 22.

Figure 3:
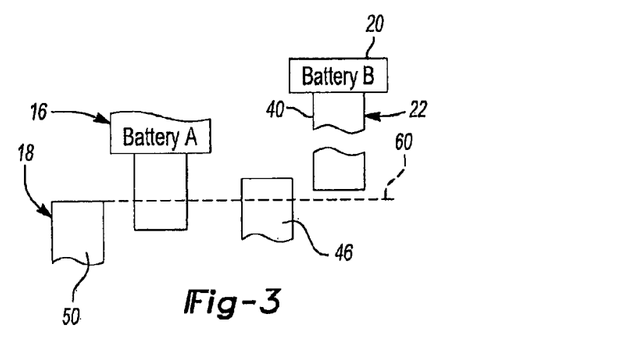
FIG. 3 is a schematic illustration of the terminals of several of the components of FIG. 1 wherein a second type of mechanical lockout is employed to prevent the coupling of a battery pack with a battery charger.

With reference to FIGS. 1 and 3, the heights of the terminals of the respective components are configured to prevent electrical coupling of the second battery pack 20 to the battery charger 18 via the adapter 22. As schematically illustrated, the top of at least one of the charger terminals (e.g., the first charger terminal 50) terminates at a datum line 60, while the top of the corresponding tool terminal(s) (e.g., the first tool terminal 46) extends above the datum line 60. In contrast, the adapter 22 is configured to present corresponding adapter terminal(s) (e.g., the first adapter terminal 40) at a location relative to the datum line 60 such that it will engage the associated tool terminal(s), but not the associated charger terminal(s). It will be appreciated that the respective housings of the tool 12, the second battery pack 20 and the battery charger 18 can be configured to control the presentation of the terminals relative to the datum line 60. Such techniques are within the level of ordinary skill in the art and as such, no further discussion need be provided herein. From the foregoing, it will be appreciated that the terminal(s) of the adapter 22 can be electrically coupled to the terminal(s) of the tool 12, but not to the terminal(s) of the battery charger 18.

Figure 4:
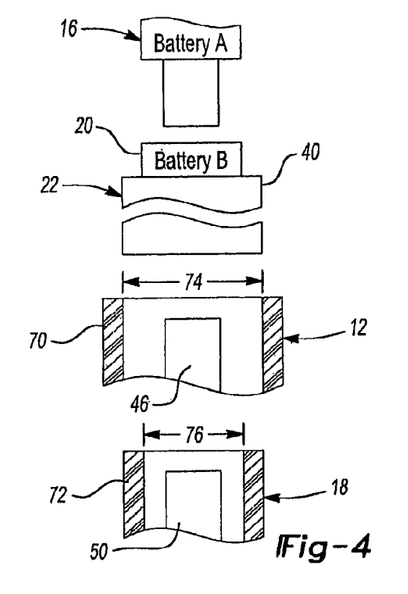
FIG. 4 is a schematic illustration of the terminals of several of the components of FIG. 1 wherein a third type of mechanical lockout is employed to prevent the coupling of a battery pack with a battery charger.

With reference to FIGS. 1 and 4, the widths of the terminals of the several components are selected to inhibit the coupling of the second battery pack 20 to the battery charger 18 via the adapter 22. As shown, the tool 12 can include a shroud 70 that can extend about an associated tool terminal (e.g., the first tool terminal 46) and the battery charger 18 can include a shroud 72 that can extend about an associated charger terminal (e.g., the first charger terminal 50). The shroud 70 can have a first internal width 74 that can be larger than a second internal width 76 associated with the shroud 72. The adapter 22 can include an associated terminal (e.g., the first adapter terminal 40) having a width that is greater than the second internal width 76 but less than the first internal width 74. It will be appreciated that the charger terminal(s) can be configured so as to prevent mechanical engagement with the adapter terminals in some instances. For example, the adapter 22 could employ male blade terminals and the battery charger 18 could employ female terminals that would not receive the relatively wider terminals of the adapter 22.

It will also be appreciated that the terminals described with regard to the embodiments of FIGS. 3 and 4 could be any type of terminal including power terminals and "logic" terminals (e.g., terminals that are configured to transmit data, including sensor signals, as opposed to terminals that conduct electrical power for operating the tool 12). It will also be appreciated that while the structures are described as being "terminals" for conducting electricity. Non-conductive structures may be employed to similarly permit the coupling of the adapter 22 to the tool 12 while inhibiting coupling of the adapter 22 to the battery charger 18. Such structures could be associated with the terminal blocks of the associated components and/or with the housings of the associated components. For example, the recesses into which the first battery pack 16 is received into the tool 12 and the battery charger 18 can be sized differently (e.g., the recess in the tool 12 can be larger than the recess in the battery charger 18) so that the housing of the adapter 22 is sized to fit within the recess in the tool 12, but not in the recess of the battery charger 18.

Figure 5:
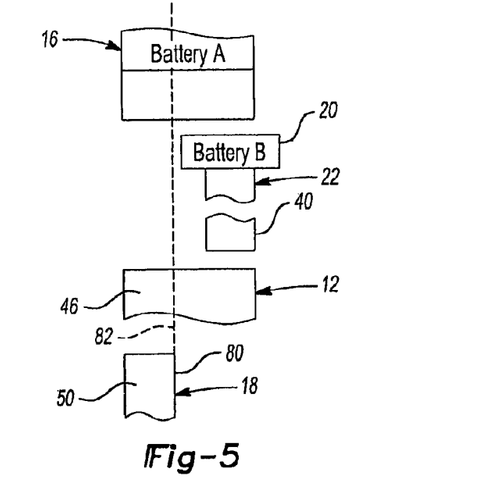
FIG. 5 is a schematic illustration of the terminals of several of the components of FIG. 1 wherein a fourth type of mechanical lockout is employed to prevent the coupling of a battery pack with a battery charger.

With reference to FIGS. 1 and 5, the location and width of the various terminals can be configured to inhibit electrical coupling of the adapter 22 and the battery charger 18. As schematically illustrated, the battery charger 18 includes a terminal (e.g., the first charger terminal 50) having a lateral side 80 that defines a datum line 82. Correspondingly, the adapter 22 includes a terminal (e.g., the first adapter terminal 40) that is offset from the datum line 82 such that when the adapter 22 is coupled to the battery charger 18, the terminal(s) of the adapter 22 are offset from the corresponding terminal(s) of the battery charger 18. It will be appreciated that the tool can employ a terminal (e.g., the first tool terminal 46) having a width that permits coupling with an associated terminal of the adapter 22.

Figure 6:
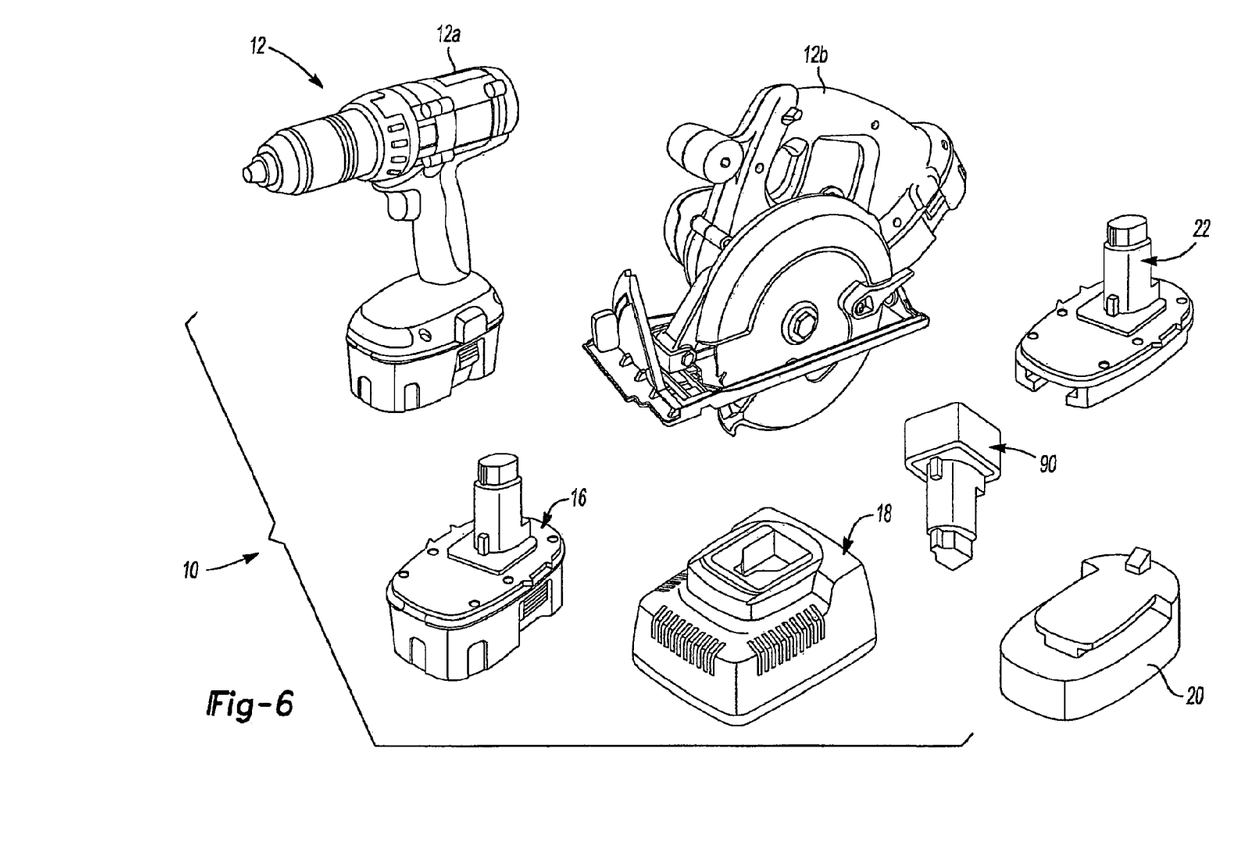
FIG. 6 is a perspective view similar to the view of FIG. 1 but including a second adapter that facilitates the coupling of a battery pack to the battery charger.
Figure 7:
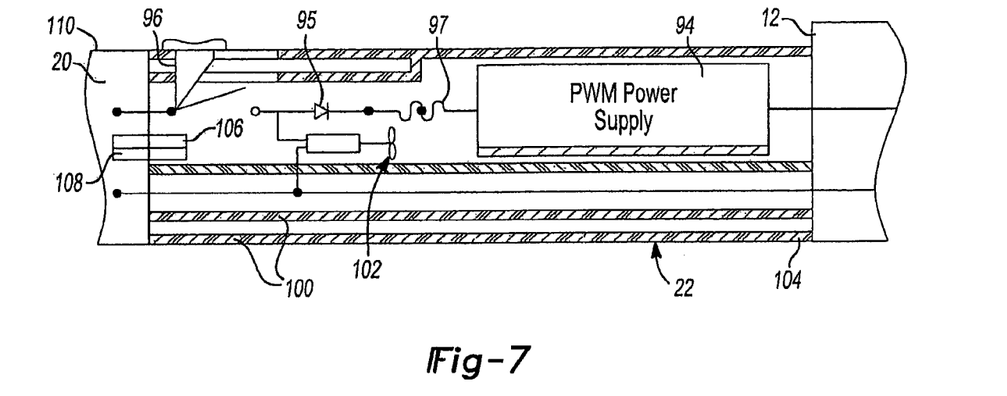
FIG. 7 is a schematic illustration of an adapter as coupled to a battery pack and a tool, the adapter being constructed in accordance with the teachings of the present disclosure.

In the example of FIG. 6, the system of cordless power tools 10 can further include a second adapter 90 that is configured to be received between the adapter 22 and the battery charger 18. The second adapter 90 can be configured to receive power from the battery charger 18 and to control the transmission of power through the adapter 22 to permit charging of the second battery pack 20. It will be appreciated that the second adapter 90 can include appropriate power devices (e.g., transformers, DC-to-DC converters, pulse-width modulation power supplies/converters, current limiters) to control the output (e.g., voltage and/or current output) from the second adapter 90 to a desired level. Moreover, the second adapter 90 can include appropriate "intelligence" to monitor the second battery pack 20 during charging and to control the charging process in a manner that is consistent with a desired charging methodology. Such intelligence can include timers, temperature monitoring, and cell balancing within the second battery pack 20, etc. It will be appreciated that the second adapter 90 could be removably attached to the battery charger 18 in an appropriate manner (e.g., screws, VELCRO®) or could be permanently attached to the battery charger 18 via any desired means, including adhesives. It will also be appreciated that the electronics associated with the second adapter 90 could be incorporated into the adapter 22 (i.e., thereby eliminating the need for the second adapter 90) or that the second adapter 90 could, in the alternative, be configured to connect directly to the battery charger 18 and the second battery pack 20.

In the example of FIGS. 7 through 10, the adapter 22 includes appropriate electronics to permit the battery to provide power to the tool 12. For example, the adapter 22 could include a DC-to-DC converter, a current limiter, a pulse width modulation power supply/converter 94, diodes 95, switches 96, relays, fuses 97, circuit breakers, etc. Moreover, the adapter 22 can include a heat sink, could be double insulated 100 and/or could include a motor-powered fan 102 that provides forced air cooling of the adapter 22 and/or the second battery pack 20. In the example provided, the adapter 22 has a housing 104 that defines a first set of air vents 106 that are disposed in-line with a second set of air vents 108 formed in a housing 110 of the second battery pack 20. Accordingly, air can be moved by the fan 102 to cool the second battery pack 20.

Figure 8:
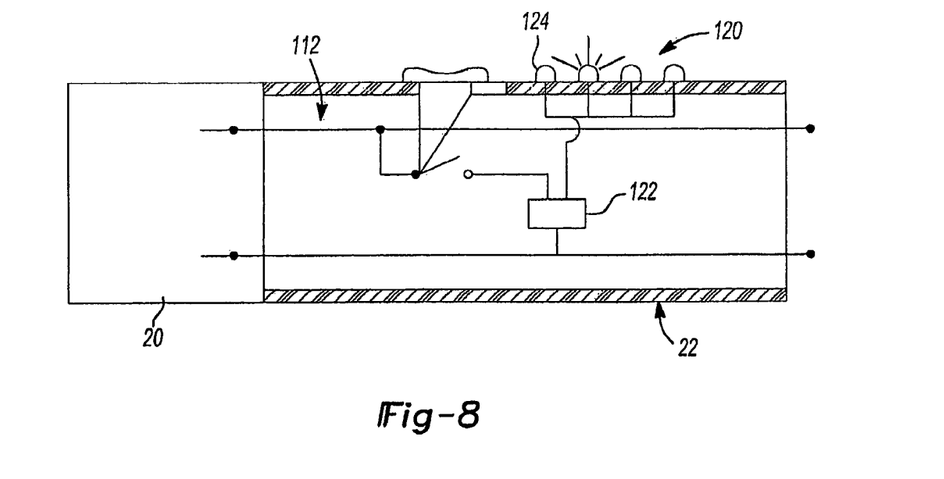
FIG. 8 is a schematic illustration of an adapter as coupled to a battery pack and a tool, the adapter being constructed in accordance with the teachings of the present disclosure.

In another example illustrated in FIG. 8, the adapter 22 includes a circuit 112 that can provide additional functionality to the tool 12. For example, the adapter 22 can include an indicator 120 that can provide the operator with an indication of the state-of-charge of the second battery pack 20. The indicator 120 could comprise a plurality of LED's or a liquid crystal display, for example. As another example, the adapter 22 could include a circuit 122 for controlling the discharge of the second battery pack 20 to "condition" the second battery pack 20. Such conditioning could comprise a gradual discharge of the second battery pack 20 to a predetermined level after which the adapter 22 could operate a light source 124 to generate a signal to the operator to indicate that the second battery pack 20 should be re-charged. Other examples include circuitry to log and optionally report data obtained from the second battery pack 20, the tool 12 and/or the battery charger 18; circuitry and one or more sensors (e.g., accelerometers, torque sensors) to identify situations involving kickback and/or significant torque reaction and to control further operation of the tool 12 to reduce or eliminate the kickback and/or torque reaction; circuitry to sense and display a temperature (e.g., ambient air temperature); and a display for displaying information about the second battery pack 20, such as the age of the battery (e.g., hours of use; number of recharges).

Figures 9, 10:
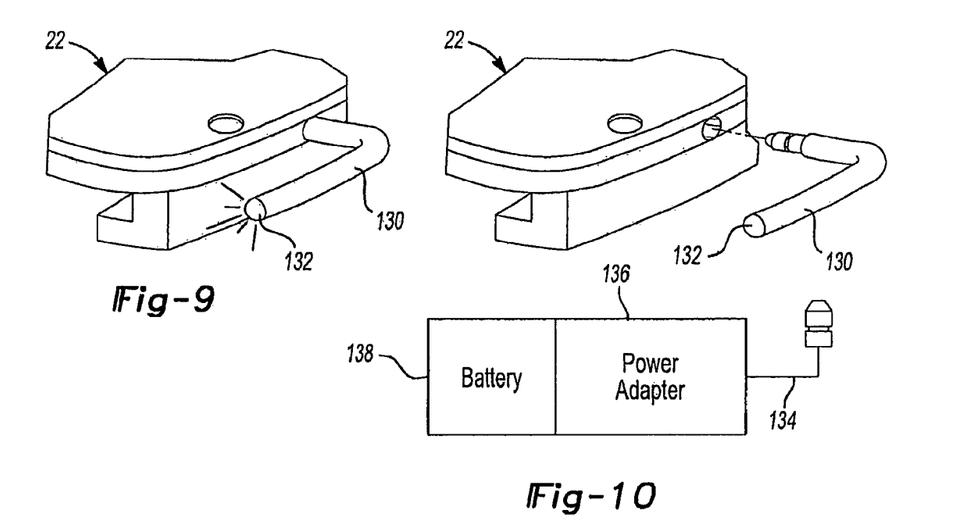
FIG. 9 is a perspective view of another adapter constructed in accordance with the teachings of the present disclosure, wherein an accessory is permanently mounted to the adapter.
FIG. 10 is a perspective view of another adapter constructed in accordance with the teachings of the present disclosure, wherein an accessory is removably coupled to the adapter.

In a further example, the adapter 22 is configured to provide electrical power to an accessory 130. The accessory 130 could be permanently mounted to the adapter 22, as shown in FIG. 9, or could be removably mounted to the adapter 22 as shown in FIG. 10. The accessory 130 could include a light source 132 for illuminating a work piece or a level for providing an indication (e.g., audible beep) that the tool 12 is being maintained in a level condition, for example. In situations where the accessory 130 is removably coupled to the adapter 22, it should be appreciated that the combination of the adapter 22 and the second battery pack 20 could be employed to provide electrical power to another electric device. In the example of FIG. 10, a cable 134 is employed to output electrical power from the second battery 20 (FIG. 1) via the adapter 22 and provide the electrical power to another accessory 136, such as a device that can be employed to charge a third battery pack 138 that could be associated with an MP3 player, a cell phone, or a PDA, for example. The adapter 22 could be configured with a DC-to-DC converter that permits the power output to be maintained at a predetermined level, such as 3.7 volts. It will be appreciated that the second battery pack 20 can be charged through the port P on the adapter 22 by coupling the adapter 22 to a charger, such as a "wall wart" charger.

Figure 11:
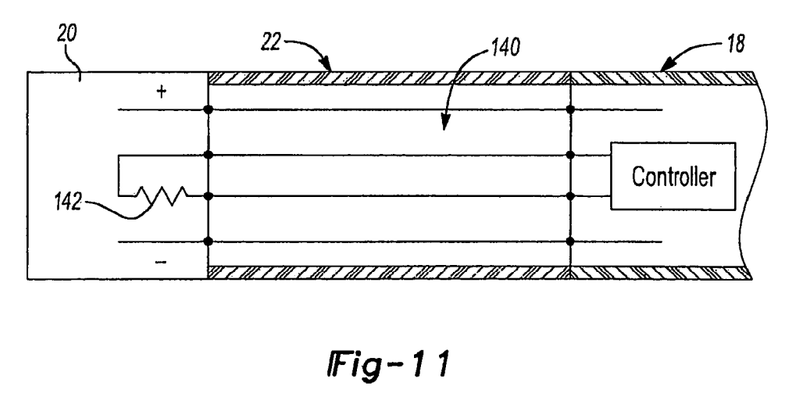
FIGS. 11 through 15 are schematic illustrations of various adapters that are coupled to a battery pack and a battery charger.

In the example of FIG. 11, the battery charger 18 is configured to mechanically receive the adapter 22 and the battery charger 18 electronically determines whether it can charge the second battery pack 20. For example, the battery charger 18 could identify the second battery pack 20 (e.g., battery chemistry, nominal voltage) via a characteristic of the second battery pack 20 and/or a device that is employed to provide an identification signal to the battery charger 18 that can be permits the battery to be identified. For example, the battery charger 18 could employ a time-based charge differential to determine an associated set of battery characteristics. A first range of slopes of a change-in-battery voltage-over-time plot could indicate a second, different battery chemistry. Other battery characteristics, such as the amount of heat generated during the charging process, could also be employed to identify the battery chemistry.

In addition to or in lieu of the characteristics of the second battery pack 20, an electronic identification means can be employed to permit the battery charger 18 to identify one or more battery characteristics. In FIG. 11, a circuit 140, which can consist of resistors, diodes, jumpers, etc. can be employed for purposes of identification. The circuit 140 could employ a resistor 142 having a first resistance to identify a first set of battery characteristics (e.g., a first nominal voltage and/or battery chemistry) and a different battery could employ a resistor having a second (different) resistance to identify a second (different) set of battery characteristics.

Figure 12:
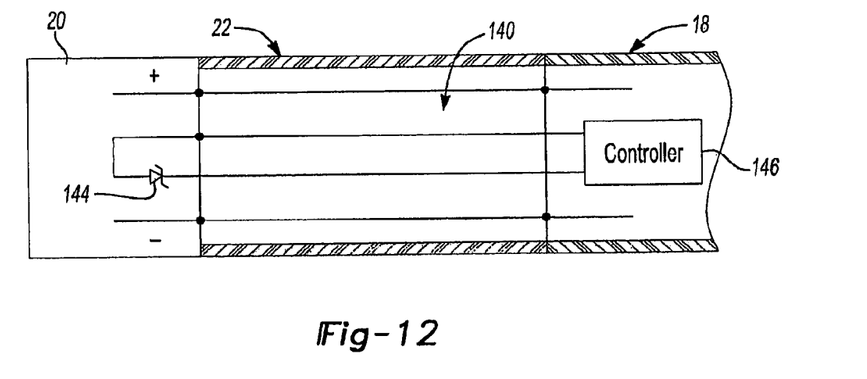

In FIG. 12, a diode 144 is employed to establish a direction of nominal current flow and optionally, to establish a breakdown voltage at which current can be driven in a direction opposite the direction of nominal current flow. The battery charger 18 can include a controller 146 that can control the application of power across the circuit 140 to determine whether the flow of current is inhibited in one or more directions. The diode 144 can further be a Zener diode whose breakdown voltage can be associated with a set of battery characteristics. In this regard, nominal current flow in one direction could designate a first battery chemistry, for example, while nominal current flow in a second direction (in both directions or in neither direction) could designate a second battery chemistry. Where Zener diodes are employed, a first breakdown voltage can designate a first nominal battery voltage and a second breakdown voltage (or a lack thereof) can designate a second nominal battery voltage.

Figure 13:
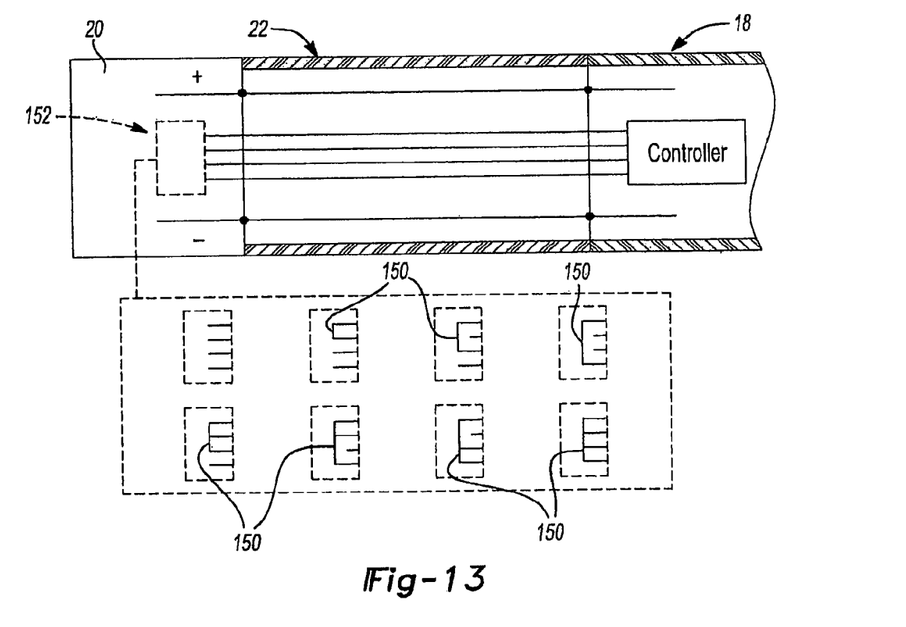

In still another embodiment that is illustrated in FIG. 13, jumpers 150 can be employed to control the transmission of a control signal across a set of terminals 152. The control signal could be provided by the battery charger 18 or the second battery pack 20. For example, a set of four such terminals 152 can provide eight or more unique combinations (depicted in the circled area) that can each represent a unique set of battery characteristics.

Figure 14:
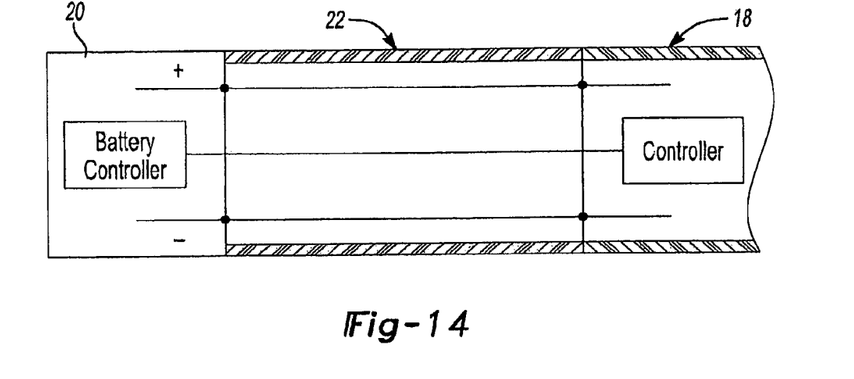

In yet another embodiment, the second battery pack 20 could transmit digital (e.g., serial) data to the battery charger 18. The digital data could include a set of characteristics in a predetermined order, or a code, such as a serial number, that could be "de-coded" by the battery charger 18 to identify the set of characteristics. It will be appreciated that the digital data could be communicated over a wire 156, as shown in FIG. 14, or wirelessly (e.g., via wave energy, such as sound, light, in either or both the visible and non-visible spectrums, or radio frequency). If desirable, the battery charger 18 could be configured to not charge the second battery pack 20 through the adapter 22 or to charge the second battery pack 20 in a different mode (e.g., a slow-charge mode that could take several hours to complete). For example, radio frequency identification (RFID) tags may be incorporated into one or both of the first and second battery packs 16 and 20 (or the first battery pack 16 and the adapter 22) and a RFID reader can be incorporated into one or both of the battery charger 18 and the tool 12. Charging of the battery pack 20 or operation of the tool 12 would be permitted upon acceptable matching of the RFID tag of a battery pack (or the adapter 22) to the battery charger 18 or the tool 12.

Figure 15:
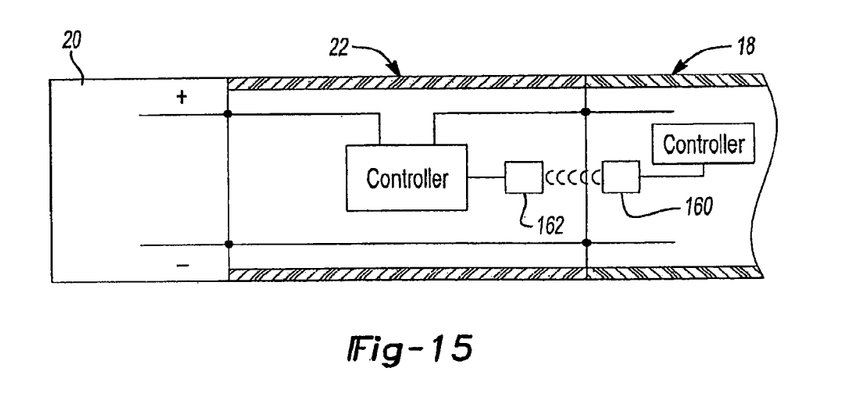

As another example which is illustrated in FIG. 15, the tool 12 and/or the battery charger 18 could include a piezo-electric buzzer 160, while the adapter 22 could include a transducer 162 that is be configured to detect the energy emitted by the piezo-electric buzzer 160. The adapter 22 could be configured to permit the transmission of electrical energy to/from the second battery pack 20 upon the detection of energy emitted from a piezo-electric buzzer 160. Similarly, the tool 12 and/or battery charger 18 could include a transducer that is configured to detect energy emitted by a piezo-electric buzzer incorporated into a battery pack. In this example, the adapter 22 does not employ a piezo-electric buzzer. If energy from a piezo-electric buzzer is not detected by the tool 12 and/or the battery charger 18, the tool 12 and/or the battery charger 18 could be configured so as not to receive/transmit electrical energy to the battery pack 20.

Figure 16:
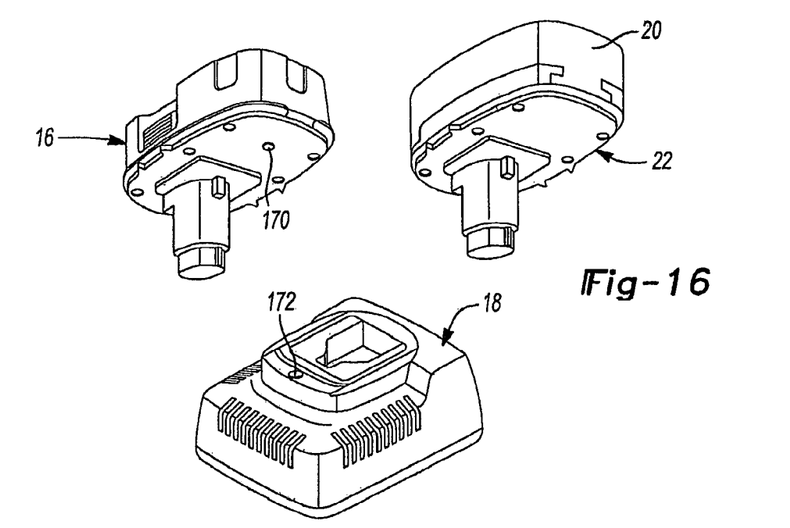
FIG. 16 is a perspective view of a portion of a cordless power tool system with a battery charger that is configured to sense that an appropriate battery has been docked in the battery charger.

In FIG. 16, a switch can be employed to identify the set of battery characteristics to permit the battery 20 to be charged on the battery charger 18 or operate the tool 12. In this regard, the battery charger 18 and/or the tool 12 could be configured to sense a switching member, such as a magnet, that is disposed in or on the first battery pack 16. For example, a magnet 170 could be incorporated into the first battery pack 16 and the battery charger 18 could employ a sensor 172, such as a Hall-effect sensor or a reed switch, that senses the presence of the magnet 170 to enable the battery charger 18 to charge the first battery pack 16. In contrast, the adapter 22 could be configured without the switching member (e.g., magnet 170) so that the second battery pack 20 could not be charged by the battery charger 18. It should be appreciated that the switch could be incorporated into the battery pack and the switching member incorporated into the battery charger 18 and/or the tool 12 in the alternative. It should also be appreciated that the tool 12a (FIG. 1) could be configured to cooperate with the battery pack to permit the tool 12a (FIG. 1) to operate only if the battery pack and the tool are compatible. For example, the tool 12a could include a sensor similar to a switching member that is coupled to the battery pack.

Figure 17:
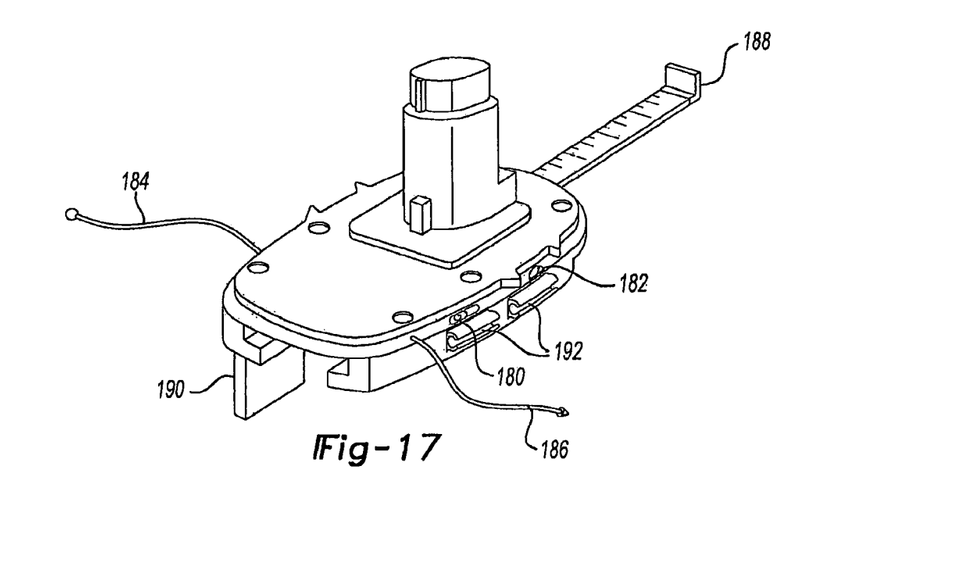
FIG. 17 is a perspective view of an adapter that includes various tools and devices to thereby provide additional functionality.

With reference to FIG. 17, it will be appreciated that various mechanical devices could be incorporated into the adapter 22, including a spirit level 180, an analog temperature gauge 182, a chalk line 184, a plumb bob 186, a tape ruler 188, a belt clip 190, and/or a tool bit holder 192. Moreover, the adapter 22 could have a configuration that permits electric and mechanical coupling of two (2) of the second battery packs 20 so that the battery packs are disposed in parallel or series and provide electrical power to a single set of output terminals. Such adapters for use in "ganging" battery packs together may be suited for stationary battery powered devices, including power converters, saws, and engine starters for engine-driven devices such as generators, pressure washers and air compressors.

While described thus far in conjunction with the battery charger 18, it will be appreciated that the tool 12—may be similarly equipped with appropriate logic corresponding to that which was described in the several preceding paragraphs. In the event of a mis-match between the tool and the battery (e.g., the combination of the tool 12 and the second battery pack 20), or in the failure of the adapter to transmit or permit the transmission of one or more types of information between the second battery pack 20 and the tool 12, the tool 12 could be configured to operate in an alternative manner. Non-limiting examples of such alternative operation include: non-variable (i.e., constant) speed operation of the motor; limiting the maximum speed of the motor; operating the motor such that it generates noise when it is activated; delaying the start of the motor after the trigger is pressed; and employing an alternative control methodology to start the motor, such as no soft-start mode or a soft-start mode that is between 10 and 10,000 times longer than the duration of the tool's standard soft-start mode.

To facilitate the transition to a new battery platform where significant quantities of tools are in circulation that utilize an older battery platform, it may be desirable in some situations to provide a program in which the adapters 22 and/or battery chargers (not shown) for the second battery pack 20 are provided free of charge to consumers to facilitate the use of batteries from the new battery platform.

Figure 18:
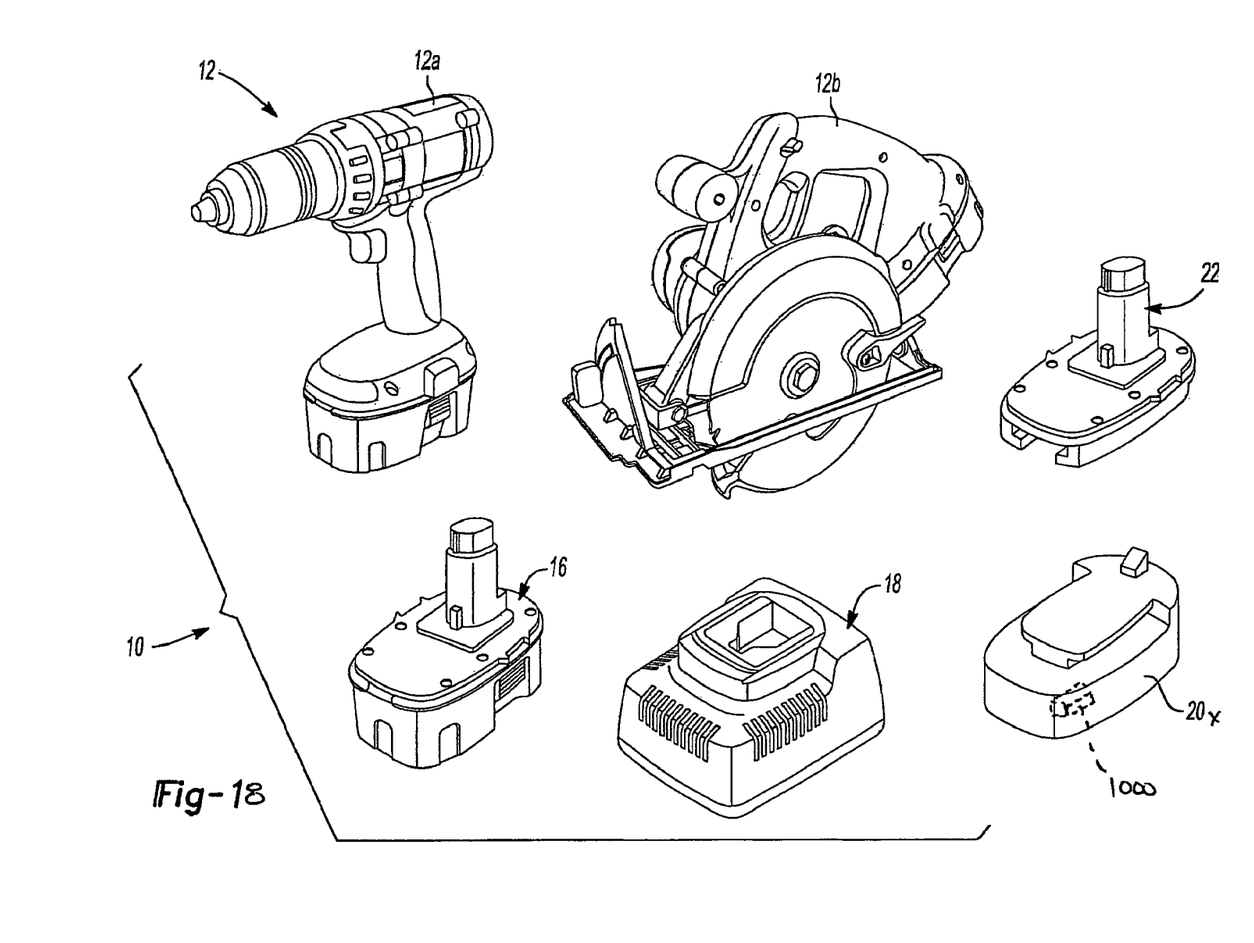
FIG. 18 is a perspective view of a portion of another exemplary system of tools constructed in accordance with the teachings of the present disclosure.

With reference to FIG. 18, a portion of another exemplary system of cordless power tools is illustrated to include the battery pack charger 18 and a second battery pack 20x. The second battery pack 20x can include a controller 1000 that can identify whether the second battery pack 20x is coupled to a battery pack charger (e.g., the battery pack charger 18) having a configuration (e.g., electrical, charging control methodology) that differs from the configuration of its associated battery pack charger (not shown). In the example provided, the second battery pack 20x has a lithium-ion battery chemistry and the battery pack charger 18 is configured to charge a battery pack having a Ni-Cad battery chemistry.

The controller 1000 can employ any means for determining whether it is coupled or being coupled to a battery pack charger having a different configuration. For example, proximity switches and/or electronic identification circuits, such as identification resistors, can be employed to identify the particular type of battery pack charger to which the second battery pack 20x is coupled. In the example provided, the second battery pack 20x includes an electric terminal that is employed to identify the particular battery pack charger that is used. The controller 1000 can be configured to assume that it has been coupled to its battery pack charger (i.e., to a battery pack charger that associated with the configuration of the second battery pack 20x) when it receives a predetermined control signal over the electric terminal from the battery pack charger. The controller can also be configured to assume that it has been coupled to a battery pack charger having a different configuration when no control signal or a different control signal from the battery pack charger. It will be appreciated, however, that various means are known for distinguishing between different battery configurations, including the use of alternate terminals (e.g., alternate power and/or control signal terminals).

In a first example, the controller 1000 can be configured to monitor a state-of-charge of the second battery pack 20x and when charged to a predetermined level, the controller can control a characteristic of the second battery pack 20x to mimic the operation of a battery pack having a configuration that is associated with the battery charger 18. For example, the controller 1000 can control the second battery pack 20x to mimic a battery pack having a Ni-Cad battery chemistry. In this regard, the controller 1000 can control the voltage output of the second battery pack 20x to cause the second battery pack 20x to provide an output whose voltage varies over time in a manner that employs two inflection points in the voltage-versus-time plot (see, e.g., U.S. Pat. Nos. 4,392,101; 4,388,582; and 6,954,051—the "voltage slope detect method"). As another example, the controller 1000 can control an output of a control terminal, such as a terminal that is configured to communicate a battery temperature signal to the battery pack charger, so that the output of the control terminal will be interpreted by the battery pack charger 18 as indicating that the second battery pack 20x is fully charged (see, e.g., U.S. Pat. Nos. 3,935,525; 5,896,024; 6,020,071 and 6,489,752). As still another example, the controller 1000 can control the voltage of the output of the second battery pack 20x such that a predetermined minus-delta voltage is found in the voltage-versus-time plot (see, e.g., U.S. Pat. No. 5,896,024. 6,008, 628—the "minus-delta-voltage method").

In another example, the controller 1000 can electrically de-couple the second battery pack 20x from the battery pack charger 18 when the second battery pack 20x has been charged to the predetermined level. For example, one or more relays (not shown) can be coupled to the controller 1000 and the positive and/or negative power terminals (not shown) of the second battery pack 20x. The relay can be normally closed to connect the power terminal(s) to the cells (not specifically shown) of the second battery pack 20x, but could be opened by the controller 1000 as appropriate (e.g., when the controller 1000 determines that the second battery pack 20x is charged to the predetermined level).

As yet another example, the controller 1000 can employ an alternate charging circuit to control charging when it has determined that the battery pack charger has a different configuration. Such alternate charging circuits can employ circuitry to limit the rate at which power is input to the second battery pack 20x and/or to inhibit the input of power into the second battery pack 20x when its state of charge is at or above a predetermined level.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description.

What is claimed is:

1. An electrical combination comprising:
   a power tool having a first connecting structure, the power tool including a tool housing and an electric motor supported by the tool housing and operable to drive a tool element, the first connecting structure having tool leads;
   a battery having a second connecting structure, the first connecting structure being incompatible with the second connecting structure, said battery having first battery terminals;
   a battery charger having the first connecting structure, the battery charger having charger terminals; and,
   an adapter separate from and connectable between the battery and the tool housing to support the battery on the tool housing, the adapter having adapter leads for electrically coupling the battery to the power tool, the adapter having a mechanical lockout for allowing an electrical coupling between the adapter and the power tool and preventing an electrical coupling between the adapter and the battery charger, wherein the mechanical lockout comprises a barrier disposed between the adapter leads and having a width that is comparatively greater than the width of a receiving recess disposed in the battery charger to prevent connection of the adapter with the charger.

2. The electrical combination of claim 1, wherein the receiving recess is positioned between the charger terminals.

3. The electrical combination of claim 2, wherein the receiving recess is formed in a shroud disposed at least partially about the charger terminals.

4. An electrical combination comprising:
   a power tool having a first connecting structure, the power tool including a tool housing and an electric motor supported by the tool housing and operable to drive a tool element, the first connecting structure having tool terminals of a first configuration;
   a battery having a second connecting structure, the first connecting structure being incompatible with the second connecting structure, said first battery having first battery terminals;
   a battery charger having the first connecting structure, the battery charger having charger terminals of a second configuration that is comparatively different than the first configuration of the tool terminals;
   an adapter separate from and connectable between the battery and the tool housing to support the battery on the tool housing; the adapter having adapter leads of a third configuration that allows electrically coupling of the adapter to the power tool and prevents electrically coupling of the adapter with the battery charger, wherein the tool terminals have a first length that is adapted to electrically couple the adapter to the power tool and that is comparatively longer that a second length of the charger terminals that is insufficient to electrically couple the adapter to the battery charger.

5. An electrical combination comprising:
   a power tool having a first connecting structure, the power tool including a tool housing and an electric motor supported by the tool housing and operable to drive a tool element, the first connecting structure having tool terminals of a first configuration;
   a battery having a second connecting structure, the first connecting structure being incompatible with the second connecting structure, said first battery having first battery terminals;
   a batter charger having the first connecting structure, er having n charger terminals of a second configuration that is comparatively similar to the first configuration of the tool terminals;
   an adapter separate from and connectable between the battery and the tool housing to support the battery on the tool housing; the adapter having adapter leads of a third configuration that allows electrically coupling of the adapter to the power tool and prevents electrically coupling of the adapter with the battery charger, wherein the adapter terminals have a width length that is adapted to allow electrical coupling of the adapter to the power tool while preventing electrically coupling of the adapter to the battery charger.

6. The electrical combination of claim 5, wherein the battery charger further comprises a first shroud with a recess of a width that is comparatively less than the width of the adapter leads that prevents electrical coupling of the adapter to the battery charger.

7. The electrical combination of claim 6, wherein the power tool comprises a second shroud with a recess of a width that is comparatively greater than the width of the adapter leads that allows electrical coupling of the adapter to the power tool.

8. An electrical combination comprising:
- a power tool having a first connecting structure, the power tool including a tool housing and an electric motor supported by the tool housing and operable to drive a tool element, the first connecting structure having tool leads;
- a battery having a second connecting structure, the first connecting structure being incompatible with the second connecting structure, said first battery having first battery terminals;
- a battery charger having the first connecting structure, the battery charger having charger terminals; and,
- an adapter separate from and connectable between the battery and the tool housing to support the battery on the tool housing, the adapter having adapter leads for electrically coupling the battery to the power tool, the adapter leads being offset from an engaging path for allowing an electrical coupling between the adapter and the power tool and preventing an electrical coupling between the adapter and the battery charger.

9. An electrical combination comprising:
- a power tool having a first connecting structure, the power tool including a tool housing and an electric motor supported by the tool housing and operable to drive a tool element, the first connecting structure having tool leads;
- a battery having a second connecting structure, the first connecting structure being incompatible with the second connecting structure, said first battery having first battery terminals;
- a battery charger having the first connecting structure, the battery charger having charger terminals; and,
- an adapter separate from and connectable between the battery and the tool housing to support the battery on the tool housing, the adapter having adapter leads for electrically coupling the battery to the power tool, the adapter having a first secondary adapter for connecting to the battery and a second secondary adapter, connecting the first secondary adapter to the battery charger, and having a battery charger circuit to control the transmission of power to the battery from the battery charger.

* * * * *